(12) United States Patent   (10) Patent No.:  US 6,729,757 B2
Faure et al.                (45) Date of Patent:      May 4, 2004

(54) METHOD OF AND A DEVICE FOR FLATNESS DETECTION

(75) Inventors: Jean-Paul Faure, Eragny sur Oise (FR); Thierry Malard, l'Isle Adam (FR)

(73) Assignee: Vai Clecim, Nanterre Cedex (FR)

( * ) Notice: Subject to any disclaimer, the term of this patent is extended or adjusted under 35 U.S.C. 154(b) by 0 days.

(21) Appl. No.: 09/982,538

(22) Filed: Oct. 19, 2001

(65) Prior Publication Data

US 2002/0080851 A1 Jun. 27, 2002

(30) Foreign Application Priority Data

Oct. 20, 2000 (FR) .............................. 00 13495

(51) Int. Cl.[7] .......................... G01B 21/22; G01L 3/00; G01L 5/04
(52) U.S. Cl. ........................ 374/50; 374/49; 73/159; 33/533
(58) Field of Search ................ 374/50, 45, 46, 374/49; 73/159, 533

(56) References Cited

U.S. PATENT DOCUMENTS

| 3,481,194 | A | * | 12/1969 | Sivilotti et al. | |
| 3,826,132 | A | * | 7/1974 | Fetner et al. | 73/143 |
| 4,062,235 | A | * | 12/1977 | Hazelett et al. | 73/159 |
| 4,116,029 | A | * | 9/1978 | Fabian et al. | 72/31.01 |
| 4,289,005 | A | * | 9/1981 | Cabaret et al. | 72/12 |
| 4,809,527 | A | * | 3/1989 | Mitchell | 72/8 |
| 4,972,706 | A | * | 11/1990 | Adolfsson et al. | 73/159 |
| 5,693,893 | A | * | 12/1997 | Anabuki et al. | 73/862.07 |
| 6,266,983 | B1 | * | 7/2001 | Takada et al. | 72/11.1 |
| 6,289,750 | B1 | * | 9/2001 | Baumann et al. | 73/862.583 |
| 6,354,013 | B1 | * | 3/2002 | Mucke et al. | 33/533 |
| 6,427,507 | B1 | * | 8/2002 | Hong et al. | 72/9.1 |

FOREIGN PATENT DOCUMENTS

| EP | 0775 890 A1 | 5/1997 |
| EP | 0 858 845 A1 | 8/1998 |
| WO | WO 01 05530 A1 | 1/2001 |

* cited by examiner

*Primary Examiner*—Gail Verbitsky
(74) *Attorney, Agent, or Firm*—Arent Fox Kintner Plotkin & Kahn, PLLC

(57) ABSTRACT

The invention relates to a method of and a device for detecting the flatness of a metal band product at high temperature, using a measuring roll (1) having a cylindrical external face (13) comprising an angular contact sector with the band and a free sector.

According to the invention, the roll (1) is cooled down forcibly by circulating a heat exchanging fluid along at least one portion of the free sector of the external face (13) of the roll (1) and one determines the parameters responsible for the cooling efficiency such as the opening angle (B) of cooling sector, the temperature and the circulation flow rate of the heat exchanging fluid, so that the external face (13) of the roll (1) is brought back, at each revolution, to a pre-set equilibrium temperature.

The invention applies especially to the hot rolling of ferrous and non-ferrous metals.

15 Claims, 4 Drawing Sheets

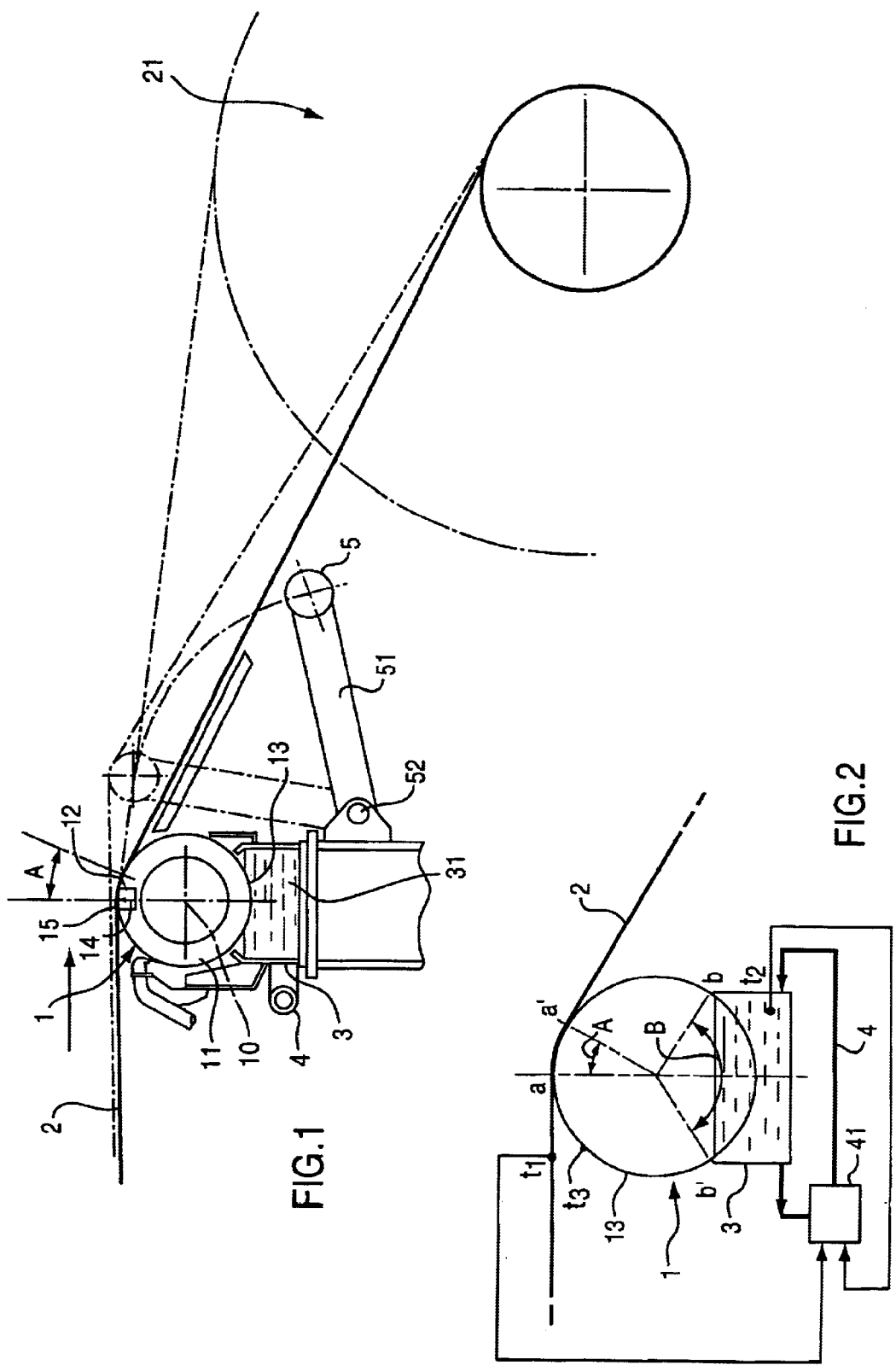

METHOD OF AND A DEVICE FOR FLATNESS DETECTION

BACKGROUND OF THE INVENTION

1. Field of the Invention

The invention relates to a method of and a device for detecting the flatness of a metal product running along a longitudinal direction and applies especially to bands at high temperature.

2. Description of Related Art

When rolling metal bands and especially thin rolled sheets, there may be flatness defects occurring when the band has been laid to rest, but are in a latent stage when the band is under tensile load. Such defects are caused, generally, by slight variations, over the width of the band, of the elongation performed by the roll mill and may be corrected while acting on the rolling conditions and, especially, on the distribution, in the transversal direction, of the clamping pressure applied between the working rolls.

To this end, it is possible, in modern roll mills, to act on the profile of the passage gap of the product, for instance by exerting bending loads on the ends of the working rolls. One may also use a back-up roll comprising a ductile shroud mounted to rotate round a fixed shaft and resting on the said by a plurality of jacks distributed over the width of the band and that may be adjusted in position and in pressure.

These means of adjustment are operated by information provided by a measuring device, placed downstream the roll mill, and sensitive to variations, over the width of the band, of the tensile load applied on the said band, which correspond themselves to the elongation variations of the longitudinal fibres of the band.

Such a measuring device consists, usually, of a deflector roll comprising a cylindrical body mounted to rotate round an axis perpendicular to the longitudinal running direction of the band. The said band is applied under tensile load on an angular sector of the external face of the roll that is fitted with a series of sensors enabling to measure the local application pressure variations of the band. Usually, these detectors are spaced regularly from one another and distributed over the whole length of the roll, whereby the band is divided into a series of longitudinal zones each having a set width, zones on which is integrated the measurement of the latent defect to be corrected.

In a known arrangement described, for example, in the document U.S. Pat. No. 3,481,194, the deflector roll comprises a central tubular body of sufficient thickness to confer the necessary strength and fitted, on its external face, with a plurality of recesses in which are placed measuring sensors.

Generally speaking, a measuring roll comprises a plurality of detection zones distributed over its whole length and each zone is fitted with a sensor for transmitting a signal that depends on the application pressure of the corresponding portion of the band, when passing through that detection zone in the angular contact sector of the band of the roll.

Moreover, to prevent any interferences between the measurements taken on two adjacent measuring zones, the sensors are advantageously offset at an angle from one zone to the next.

In such an arrangement, each measuring sensor is sensitive to the application pressure of the band, but may also be influenced by other factors that may affect the measurements negatively.

For example, to avoid any direct contact between the sensors and the running band, each recess of a sensor is closed to the outside, by a protection wall that may consist of a thin shroud covering the whole tubular body of the roll, or of a cap-shaped part slightly ductile in order to transmit to the sensors the pressure applied by the band. Such a device is therefore sensitive to thermal deformations caused when the temperature of the roll rises.

Similarly, the measuring sensors are not provided, normally, to operate at high temperature.

Therefore, until now, flatness measuring rolls had been used in cold rolling facilities in which the rolled band could be maintained at moderate temperature.

However, the latent defects resulting from elongation variations over the width of the band also occur during hot rolling and it has appeared that as of that stage, risks of flatness defects should be avoided.

In this view it had been considered sufficient so far, to provide the roll mill with a mathematical model enabling to foresee the defect zones in order to avoid the occurrence of the said defects, as far as possible, while acting on the different means of adjustment of the roll mill. The defects to be corrected can also be determined by optical means on the product when the said is not subject to any tensile load, i.e. on the head of the band, before winding the band around the coiler. Such a system therefore does not enable to control the flatness of the product over its whole length and it is thus preferable to detect the latent defects as soon as the band comes out of the roll mill.

To this end, it has been suggested in the document EP-A-0.858.845, to place in a hot rolling line, a measuring roll in which the band can be applied under tensile load.

However, even in the case of a non-ferrous metal such as aluminium, the hot band is at high temperature, which affects negatively the measurements that must be compensated for. For example, the roll can be calibrated at various temperatures in order to make the necessary corrections in relation to the temperature of the band, but such a calibration is not easy to perform.

SUMMARY OF THE INVENTION

The purpose of the invention is to remedy these problems thanks to particularly simple arrangements that can be applied to all types of flatness measuring rolls and that enable to avoid calibration of the sensors in relation to various operating temperatures.

The invention applies therefore, generally, to a method of and a device for detecting the flatness of a band product in which the band is subject to tensile load and applied on the angular sector of a measuring roll mounted to rotate round an axis perpendicular to the longitudinal running direction of the band and having a cylindrical external face comprising an angular contact sector with the band and a free sector.

According to the invention, the roll is cooled down forcibly by circulating a heat exchanging fluid along at least one portion of the free sector of the external face of the roll and one determines the parameters responsible for the cooling efficiency such as the opening of the angular cooling sector along which the fluid circulates, the initial temperature of the said fluid and the circulation flow rate, so that, after heating up while passing through the sector in contact with the band, the external face of the roll is brought back, after passing through the cooling sector of the roll, to a pre-set equilibrium temperature.

In a first particularly advantageous embodiment, forced cooling of the roll is performed by spraying a heat exchanging fluid by means of spray ramps distributed over at least one portion of the free sector of the roll and one adjusts at least the temperature of the fluid and the spray flow rate in relation to the temperature of the band, the running speed and the thermal exchange conditions, in order to bring back to a set level the temperature of the external face of the roll immediately before it goes through the contact sector.

In another embodiment, the flatness measuring roll being located beneath the band, the external face of the said roll comprises a lower section immersed in a heat exchanging fluid bath provided in a tub situated beneath the roll and associated with means for circulating the liquid with an adjustable flow rate between an inlet orifice and an outlet orifice of the tub, and one adjusts at least the initial temperature of the bath as it reaches the bath and the circulation flow rate, in order to bring back to a set level the temperature of the external face of the roll immediately before it goes through the contact sector.

Thanks to these arrangements, the external face of the roll is brought back, before it goes through the contact zone, to an equilibrium temperature t that is linked with the temperature of the band $t_1$ and the initial temperature $t_2$ of the heat exchanging fluid by a formula such as:

$$t = \frac{a\sqrt{A}\,t_1 + b\sqrt{B}\,t2}{a\sqrt{A} + b\sqrt{B}}$$

in which a is the thermal exchange coefficient between the band and the roll, b is the thermal exchange coefficient between the heat exchanging fluid and the roll, A the angular contact sector and B the angular cooling sector. According to the invention, one can act, during operation, on at least one of the parameters of the said formula in order to maintain the equilibrium temperature t at a constant level.

The invention also covers a device for flatness detection for implementing the method, comprising a means for forced cooling of the external face of the measuring roll by circulating a heat exchanging fluid along at least one portion of the free sector of the roll and means for adjusting the cooling conditions in order to maintain the external face of the roll at a set equilibrium temperature, with controlled cooling of each detection zone as it goes through the free sector of the roll.

The invention applies especially to the flatness measuring rolls of the type comprising a plurality of detection zones distributed over the length of the roll and each fitted with a sensor for transmitting a signal related to the application pressure of a corresponding portion of the band, when the said detection zone passes through the angular sector where the band contacts the roll, whereas the said detection zones are brought back to the same equilibrium temperature each time it passes through the free sector of the roll.

The invention also covers other advantageous features and will be understood better by the following description of certain embodiments, given for exemplification purposes, and represented on the appended drawings.

BRIEF DESCRIPTION OF THE DRAWINGS

FIG. 1 is a schematic view, as a cross section, of a flatness measuring device according to the invention, with the band winding beneath the running plane.

FIG. 2 is a diagram of the cooling system of a roll.

DETAILED DESCRIPTION OF THE INVENTION

Figure 3:
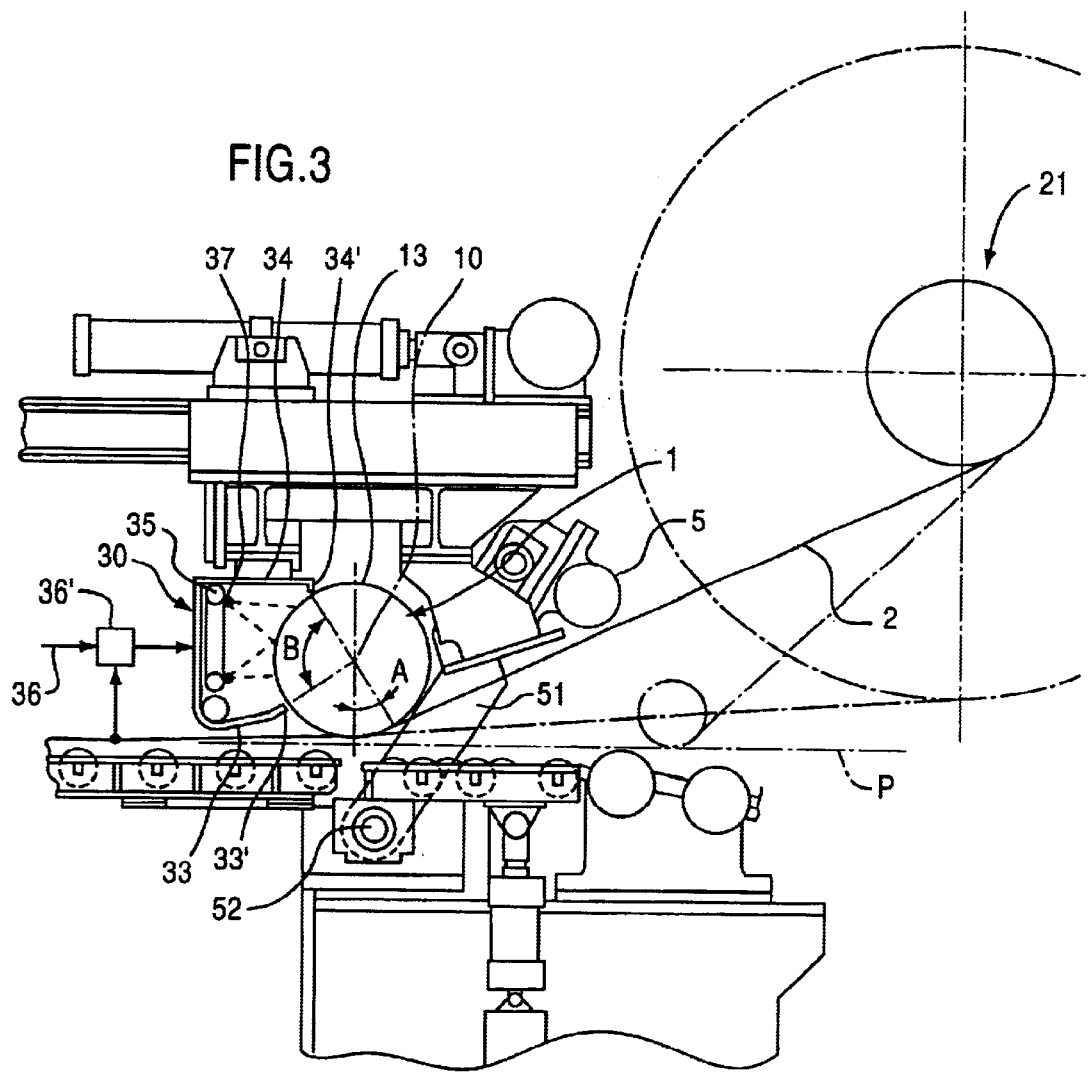
FIG. 3 shows, as a side view, another embodiment of the invention, with the band winding above the running plane.
Figure 4:
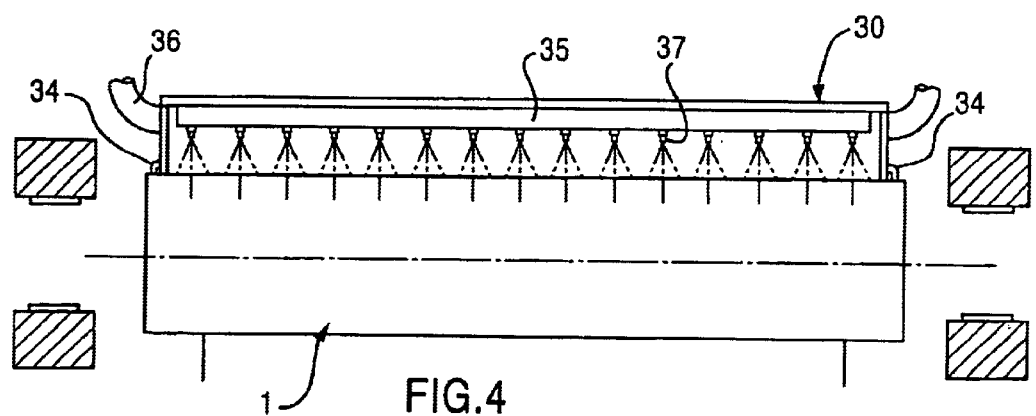
FIG. 4 is a view from beneath of the roll of FIG. 3.

FIG. 1 represents diagrammatically the assembly of a flatness measuring roll 1 on which is applied a metal band 2 that runs along a longitudinal direction parallel to the plane of the figure and winds around a coiler 21 which, in that example, is situated beneath the running plane P of the band. The band is wound under tensile load, whereas the coiler 21 is fitted, to this end, with known means that need not be described.

The band 2 is deviated by the roll 1 and applied on an angular sector of the said roll, under longitudinal tension determined by the winding control means.

The flatness measuring roll 1 can be of any known type, for example, the one described in the French patent n°2.468.878 of the same company. One knows that, generally, such a flatness roll comprises a tubular body 11 in which are provided recesses 12 that are closed by a thin shroud 13 attached to the tubular body 11. Inside each recess 12 is placed a detection device, for example a displacement sensor 14 which comprises a fixed element resting on the bottom of the recess 12 and a mobile element resting on the internal face of the shroud 13 closing the recess 13 to the outside.

The roll 11 is mounted to rotate round its axis 10 and it is fitted with a number of sensors 12, 14 distributed over its whole length in order to cover the width of the band M applied on the roll 1.

Such an embodiment is well known and does not call for any detailed descriptions. Other arrangements can be used to measure the loads applied to the roll in several detection zones distributed on the length of the said roll.

Until now, such flatness rolls had only been used in cold rolling facilities in which the rolled band exhibits moderate temperature. The arrangements according to the invention enable, conversely, to measure the flatness of a band at high temperature, whereas the measuring roll 1 can be placed downstream, in the running direction, of a hot rolling facility not represented on the figure.

The temperature of the hot band arriving on the roll 1 can range, for instance, from 250° C. to 400° C. in the case of non-ferrous metal, but it might be higher. That causes significant heating up of the roll through its external face.

However, as shown on FIG. 2, the external face of the roll 1 is covered by the band 2 only over a relatively reduced angular sector a, a' whose angle at the centre A does not exceed, normally, 20° and comprises therefore a free sector a', a ranging between 340 and 350° C. The invention makes use of this arrangement while performing forced cooling of the external face 13 of the roll by circulating a heat exchanging fluid along at least one portion of this free sector a, a' and while setting the cooling conditions in order to bring each detection zone to the same equilibrium temperature as It passes through the free sector.

In the arrangement of FIG. 1, for example, the roll 1 is located beneath the band and it is possible to immerse the lower part of the free sector in a tub 3 filled with a heat exchanging liquid 31 such as water. This tub 3 is widely open upward so that the lower section of the roll is immersed on a relatively significant angular sector B, for instance, ranging from 90 to 100°.

Thus, at every rotation of the roll, each section 15 of the shroud 13 closing a recess 12, constitutes a detection zone that is heating up first of all in contact with the band 2 while passing through the angular sector A, but is cooled down immediately when in contact with water 31 as it passes through the angular sector b, b' at the centre B.

If $t_1$ is called the temperature of the band 2 and $t_2$ the temperature of the liquid 31 contained in the tub 3, the temperature t of the external face of the roll, after passing through the liquid 31 can be given by the formula:

$$t = \frac{a\sqrt{A}\, t_1 + b\sqrt{B}\, t_2}{a\sqrt{A} + b\sqrt{B}}$$

in which a is the specific thermal exchange coefficient between the band and the roll, and b the specific thermal exchange coefficient between the heat exchanging fluid 31 and the roll 1.

These thermal exchange coefficients depend notably on the nature of the thin shroud 13 forming the external face of the roll 1, on the cooling fluid 31 and on the opening angle of the sectors A and B.

The tub 3 is connected to a system 4 for circulating the cooling fluid 31 between an inlet and an outlet, comprising means 41 for adjusting cooling parameters such as the initial temperature and the flow rate of the fluid 31 in relation to the temperature $t_1$ of the band, in order to bring the external face 13 of the roll back to a set temperature $t_3$.

At each rotation of the roll, each detection zone is therefore brought back to a constant temperature level before passing through the angular sector A in contact with the band 2 again. Thus, repetitivity of the measurement of the pressure applied by the band on the wall 15 or of the displacement of the said band is ensured, since the thermal influence of the band remains constant.

As cooling takes place at each rotation, with a constant ratio between the heating up time and the cooling time, the running speed of the band may vary, for example in relation to the reduction in thickness performed in the roll mill.

However, one may be led to stop the running operation, for example, to service the roll mill or another section of the installation. In such a case, the band 2 remains applied on the same portion of the roll and causes the temperature to rise, which may damage the sensors.

Consequently, it is considered, in case of stoppage, to retract the band 2 from the roll 1 using a deflector roll 5 mounted to rotate at the ends of two supporting arms 51 that may pivot round an axis 52 between a retracted position, represented as a full line on the figure, for which the band 2 is applied normally on the band 1 and an engaged position, represented as a mixed line, for which the band 1 is lifted by the roll 5 and slightly retracted from the external face 13 of the roll 1.

FIG. 3 represents, as a side view, another embodiment in which the coiler 21 is placed above the running plane P of the band 2.

The measuring roll 1 serving as a deflector roll is then placed, also, above the band 2 and it must be associated with a cooling device placed laterally. This cooling device is then made of a caisson 30 having two longitudinal walls 33, 34 parallel to the axis 10 of the roll and extending up an edge 33', 34', placed immediately close to the external face 13 of the roll. The ends 33', 34' are retracted angularly in order to delineate an angular cooling sector at the centre B at least equal to a quadrant.

Inside the caisson 30 is placed at least one fluid spray ramp formed of a conduit 35 linked to a heat exchanging fluid supply system 36 and fitted with a plurality of orifices forming fluid spray nozzles 37 directed to the external face 13 of the roll so that the fluid jets are generally contiguous and cover an angular sector of the roll, over the whole length of the roll. Advantageously, the caisson is fitted with two spray ramps 35 whose nozzles 37 are offset angularly and longitudinally the better to distribute the fluid over the whole angular sector B. As previously, the supply system 36 is associated with a means 36' for adjusting the flow rate sprayed in relation to the temperature of the band 2 to maintain the external face 13 of the roll 1 at a set temperature, ahead of the application sector A.

To avoid excessive heating of a detection zone in case of stoppage of the running and, consequently, of the rotation of the measuring roll 1, the said roll is associated with a deflector roll 5 mounted at the end of a pair of arms 51 capable of pivoting round an axis 52 between a raised position for which the band 2 is applied on the coiler 21 and a lowered position for which the band 2 is deviated by the roll 5 and is slightly retracted from the external face of the roll 1.

According to both embodiments that have just been described, to enable application under tensile load of the band 2 on an angular sector of the flatness measuring roll 1, the said roll forms a deflector roll located immediately upstream, in the running direction, the coiler 21 in order to determine the application of the band under tensile load on an angular sector of the measuring roll 1.

This is not a shortcoming when the coiler is placed at a small distance from the roll mill as, for instance, in the case of rolling non-ferrous metals such as aluminium that, when exiting the hot rolling stage, are at relatively moderate temperature, in the order of 300 to 400° C. and may be wounded into a reel immediately after measurement.

Conversely, in the case of ferrous metals such as steel, the rolled band is at much higher temperature, in the order of for example 700 to 1000° C., and must be subject to a first cooling operation before being wound into a reel. A cooling bench must then be interposed between the roll mill and the coiler that is therefore located at a rather significant distance from the roll mill. However, this first cooling stage is not homogeneous over the width of the band and may cause uneven shortening of the fibres, whereas the elongation variations caused by the roll mill can only be observed after complete cooling down of the band wound into a reel. If the measuring roll is placed just before winding, when exiting the coiling bench, the measurement of the elongation distribution might therefore be distorted.

If cooling down is necessary before winding into a reel, it is therefore more advantageous to place the measuring roll at the outlet of the roll mill, before the cooling bench.

However, if one has to wait for the head of the band to be wound on the coiler in order to subject it under tensile load, it will not be possible to control the flatness of the band over quite a significant length of the said band.

To avoid such shortcomings, it is therefore preferable to subject the band under tensile load at the measuring roll, as soon as it comes out of the roll mill.

Figure 5:
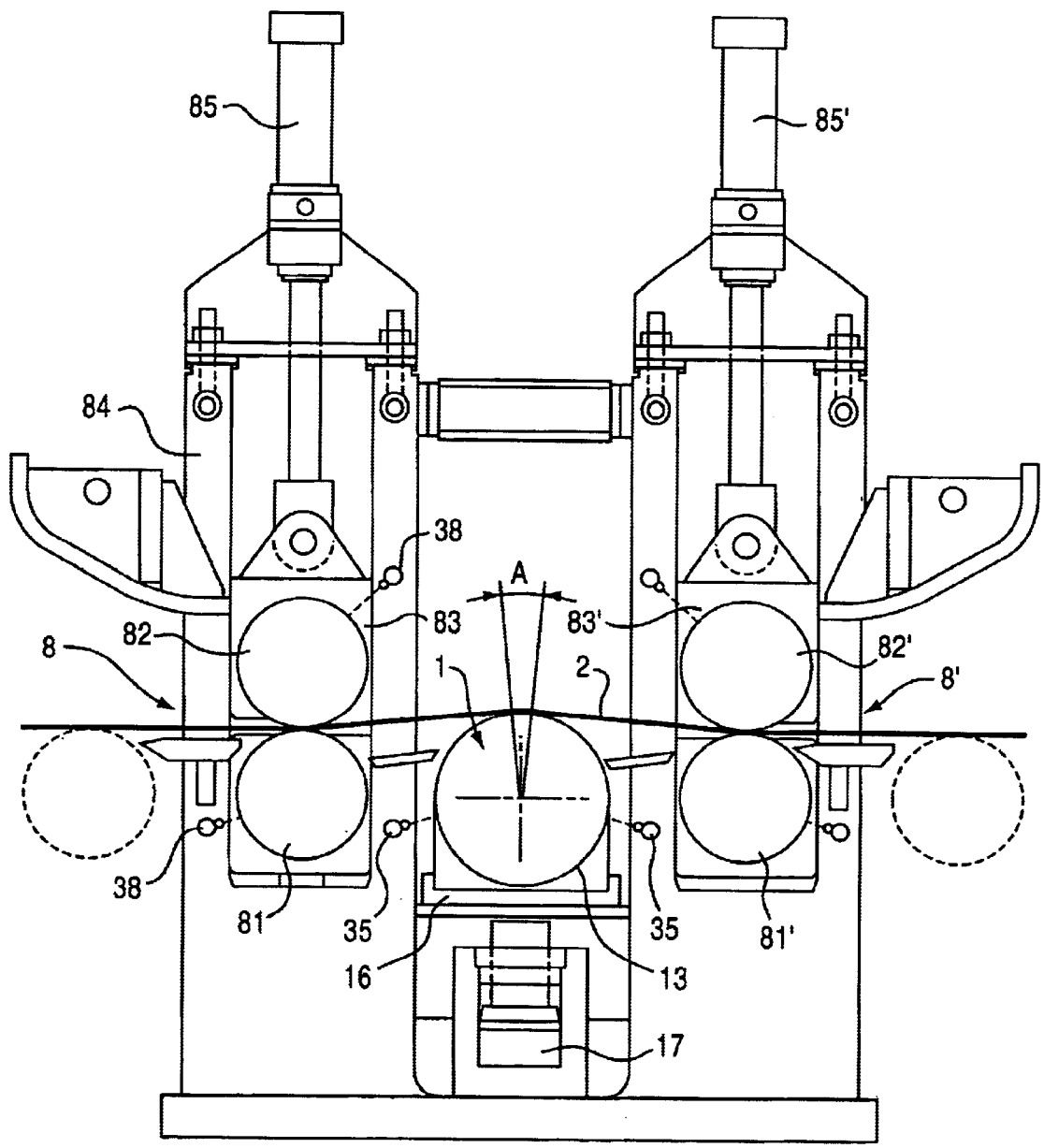
FIG. 5 is a diagrammatical view, as a cross section, of another embodiment of the invention.

To this end, as shown on FIG. 5, the flatness measuring roll 1 can be placed between two pairs of pinch rolls 8, 8' each comprising a fixed roll 81 and a mobile roll 82 mounted on a support 83 sliding vertically between two guides of a chassis 84, under the action of a jack 85.

The flatness roll 1 is carried itself by a supporting cradle 16 mounted to slide vertically under the action of a jack 17.

In lowered position of the rolls 82, 82', the band is pinched between both pairs of rolls 8, 8' and the lifting jack 17 of the supporting cradle 16 enables to adjust the relative level of the measuring roll 1 with respect to the running plane of the band and thus to determine an application angle A of the band 2 on the roll 1.

In this arrangement, at least one of the pinch rolls of each pair 8, 8' is driven into rotation at a speed that can be adjusted separately on each pair 8, 8'.

Thus, it is possible to subject the section of the band delineated between both pairs of rolls 8, 8' to a determined tensile load while adjusting separately the rotation speeds of the pinch rolls 8, 8' placed, respectively, upstream and downstream the measuring roll 1.

Spray ramps 35 arranged on either side of the roll 1 enable forced cooling down of the free sector of the said roll.

Other spray ramps 38 can be associated with both pairs of pinch rolls 8, 8'.

It is thus possible, as previously, to adjust the intensity of the cooling in order to keep the external face 13 of the roll 1 at a determined temperature, which enables to ensure repetitivity of the measurements.

It should be noted that the individual adjustment of the rotational speeds of both pairs of pinch rolls 8, 8' enables to adjust separately the tensions applied on the band in each section of the said band, respectively between the outlet of the roll mill and the pinch rolls 8, on the measuring roll 1 between both pairs of pinch rolls 8, 8' and between the pinch rolls 8' and the coiler 21.

But the invention is not limited to the details of the embodiments that have just been described for exemplification purposes and also covers other variations or other applications still within the protection framework defined by the claims.

For example, the flatness measurement of a hot band could be useful in the case of so-called 'mini-mill' installation comprising a continuous thin band cast followed by several on-line finishing roll stands, a cooling bench and a coiler.

Figure 6:
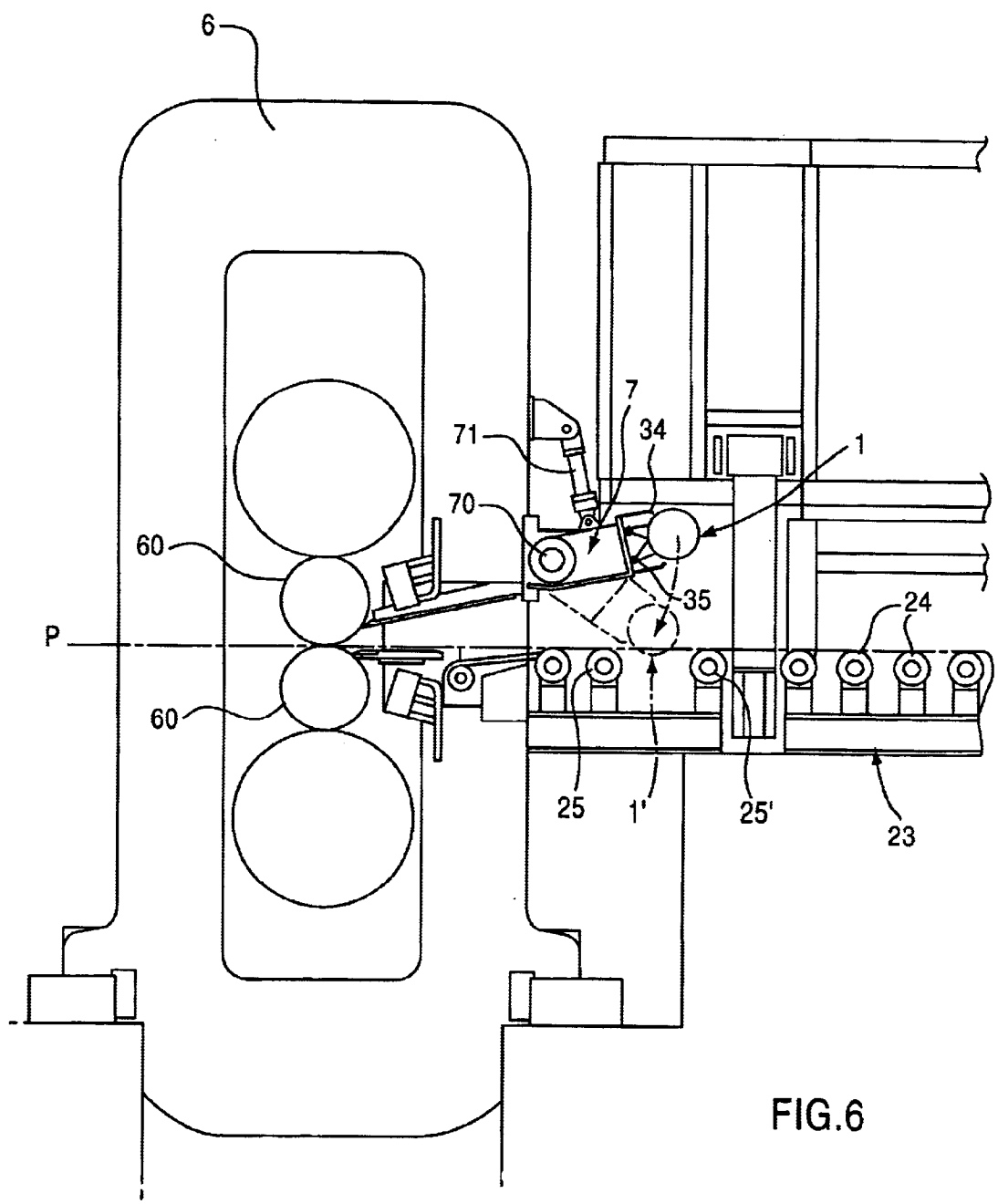
FIG. 6 shows another embodiment of the invention, in another application.

FIG. 6 shows, for exemplification purposes, such an arrangement, with only the last finishing roll stand 6. The band running from left to right on the figure along a horizontal rolling plane P passes first of all between two working rolls 60 of the roll stand 6, then over a cooling bench 23 comprising a supporting table formed of a series of rolls 24 tangent to the running plane P, as well as cooling means that are not represented on the figure.

In this embodiment of the invention, the flatness measuring roll 1 is mounted at the outlet of the roll mill, but the band can be subject to tension by the coiler at the end of the line. It is accepted, indeed, not to control the flatness on the head of the band whose length is insignificant when the band is cast continuously.

However, to determine the application angle of the band on the measuring roll 1, the said roll is mounted on a supporting cradle 7 that can pivot, round an axis 70, on two bearings aligned and fixed, for example, on the roll stand 6. A jack 71 controls the pivoting of the roll 1 between a raised position represented as a full line on FIG. 5 and a lowered position for which the roll 1' is interposed between two successive rolls 25, 25' of the roller table 23 and therefore determines the application on the measuring roll 1, of the band 2 that, in such a case, is placed under tensile load by the coiler placed at the end of the cooling bench 23 and not represented on the figure.

The tensile load applied on the band by the coiler can be adjusted in relation to the rolling speed between the working rolls 60, in order to wind the band with contiguous spires.

The opening of the angular sector of application of the band depends on the level of the lowered position 1' of the roll 1 with respect to the plane of the rolls 25, 25', which can be adjusted using the jack 71.

As in the case of FIG. 3, the measuring roll 1 is associated with a cooling caisson 34 fixed on the cradle 7 and fitted with a ramp 35 for spraying a cooling fluid on a portion of the free sector of the roll.

In case of running stoppage, it suffices to lift the cradle 7 immediately in order to retract the measuring roll from the band to prevent the said band from heating up.

The reference signs inserted after the technical features mentioned in the claims solely aim at facilitating the understanding of the said and do not limit their extent whatsoever.

What is claimed is:

1. A method of detecting flatness of a band running along a longitudinal direction and at a relatively high temperature, wherein the band is subject to a tensile load applied on an angular sector of a flatness measuring roll, which is mounted to rotate around an axis perpendicular to the longitudinal running direction of the band and has a cylindrical external face comprising an angular contact sector which contacts a portion of the band and a contact free sector, the method of detecting the flatness of the band comprises the steps of:

measuring the load applied to the flatness measuring roll in several detection zones distributed along a length of the flatness measuring roll;

forcibly cooling the flatness measuring roll by circulating a heat exchanging fluid along at least one portion of the contact free sector of the external face of the flatness measuring roll; and determining parameters responsible for cooling efficiency from a group including at least one of opening of an angular cooling sector of the flatness measuring roll along which the heat exchanging fluid circulates, an initial temperature of the heat exchanging fluid and a circulation flow rate of the heat exchanging fluid, wherein after heating the flatness measuring roll while passing through the angular contact sector of the flatness measuring roll by contact with the band, the external face of the flatness measuring roll is returned, after passing through the angular cooling sector of the flatness measuring roll, to a pre-set equilibrium temperature.

2. The method according to claim 1, wherein forced cooling of the flatness measuring roll includes:

spraying the heat exchanging fluid over at least one portion of the contact free sector of the flatness measuring roll; and adjusting at least the temperature and spray flow rate of the heat exchanging fluid relative to the temperature of the band and thermal exchange conditions, wherein a temperature of the external face of the flatness measuring roll is returned to a set level immediately before rotating through the angular contact sector.

3. The method according to claim 1, comprising:

locating the flatness measuring roll beneath the band and immersing a lower section of the external face of the flatness measuring roll in a heat exchanging fluid bath provided in a tub situated beneath the flatness measuring roll;

circulating the heat exchanging fluid with an adjustable flow rate between an inlet orifice and an outlet orifice of the tub; and adjusting at least an initial temperature and circulation flow rate of the heat exchanging fluid upon reaching the bath, wherein the temperature of the external face of the flatness measuring roll is returned to a set level immediately before rotating through the angular contact sector.

4. The method according to one of claims 1, 2 or 3, including bringing the external face of the flatness measuring roll prior to rotating through a zone of contact to an equilibrium temperature (t) that is linked with the temperature of the band ($t_1$) and the initial temperature ($t_2$) of the heat exchanging fluid by a formula:

$$t = \frac{a\sqrt{A}\, t_1 + b\sqrt{B}\, t2}{a\sqrt{A} + b\sqrt{B}}$$

in which (a) is the thermal exchange coefficient between the band and the flatness measuring roll, (b) is the thermal exchange coefficient between the heat exchanging fluid and the flatness measuring roll, (A) the angular contact sector and (B) the angular cooling sector; and manipulating during operation, at least one of the parameters of the formula to maintain the equilibrium temperature at a constant level.

5. A device which detects flatness of a band running along a longitudinal running direction and is subject to a tensile load, the flatness detection device comprising:

a flatness measuring roll mounted to rotate around an axis which is perpendicular to the longitudinal running direction of the band and on which the band is subjected to a tensile load, wherein the flatness measuring roll includes:

a cylindrical external face comprising an angular contact sector which contacts the band and a contact free sector, a plurality of detection zones distributed along a length of the flatness measuring roll, and load measuring means for measuring a load applied to the flatness measuring roll in each detection zone;

cooling means for forcibly cooling the external face of the flatness measuring roll by circulating a heat exchanging fluid along at least one portion of the contact free sector of the flatness measuring roll; and adjusting means for adjusting cooling conditions wherein the external face of the flatness measuring roll is maintained at a set temperature.

6. The device according to claim 5, wherein the flatness measuring roll is placed beneath the band and comprises an upper angular sector in contact with the band and free lower angular sector, and the cooling means comprises a tub filled with a heat exchanging liquid in which is immersed at least one portion of the contact free sector of the flatness measuring roll, and a system for circulating the heat exchanging liquid, wherein said system comprises a means for adjusting the temperature and the circulation flow rate of the heat exchanging liquid relative to the temperature of the flatness measuring roll.

7. The device according to claim 5, wherein the cooling means comprises at least one spray ramp parallel to the external face of the flatness measuring roll, a system for supplying a heat exchanging fluid fitted with a plurality of spray nozzles wherein each fluid jet from one spray nozzle covers a cooling angular sector, wherein the system includes means for adjusting the flow rate sprayed relative to the temperature of the band.

8. The device according to claim 7, further comprising a cooling caisson extending along the contact free sector of the flatness measuring roll and inside which is placed at least one fluid spray ramp, wherein said caisson exhibits two longitudinal walls parallel to the axis of the flatness measuring roll and is retracted at an angle to delineate a roll cooling sector, wherein each longitudinal wall has an edge parallel to the external face of the flatness measuring roll and retracted from the face by a small distance.

9. The device according to any one of claims 5 to 8, further comprising retraction means for quickly retracting the band relative to the flatness measuring roll.

10. The device according to claim 9, wherein the flatness measuring roll is mounted to rotate around its axis on a supporting cradle moving along a direction transverse to a running plane of the band between an application position for applying the roll on the band and a retracted position, wherein said cradle is associated with two deflectors placed respectively upstream and downstream from the flatness measuring roll in the running direction of the band and on a side opposite to the cradle relative to the band, wherein the band is applied on a set angular sector of the flatness measuring roll, in the application position of the the flatness measuring roll.

11. The device according to claim 10, wherein the supporting cradle of the flatness measuring roll is mounted to pivot around an axis parallel to the axis of the flatness measuring roll and is associated with at least one jack for controlling the pivoting of the cradle between the application position and the retracted position.

12. The device according to claim 10, wherein the supporting cradle of the roll is mounted to slide perpendicular to the running plane of the band, between the application position and the retracted position.

13. The device according to claim 10, wherein the flatness measuring roll is placed between two pairs of pinch rolls, respectively upstream and downstream, each pair of pinch rolls comprising a fixed roll and a movable roll mobile vertically for clamping the band and wherein both pairs of pinch rolls are associated respectively with individual rotational driving means that determine angular speed of the downstream rolls, a speed which is slightly greater than an angular speed of the upstream rolls, wherein the band is subject to a set application tension on the flatness measuring roll.

14. The device according to claim 13, wherein rotational speeds and torques applied on both pairs of upstream and downstream pinch rolls are adjusted relative to a rolling speed in order to separately determine tension levels of the band, respectively, at the outlet of a roll mill, on the flatness measuring roll and on a coiler.

15. The device according to claim 5, wherein the plurality of detection zones are retracted in a direction transverse to the longitudinal running direction of the band and are distributed over an entire length of the flatness measuring roll, wherein means for measuring a load in each detection zone comprises a sensor which transmits a signal depending on a pressure applied in a corresponding detection zone as the band passes through the angular contact sector, and wherein the plurality of detection zones are returned to a common equilibrium temperature, at each rotation through the contact free sector.

* * * * *